July 19, 1966
R. F. GAMES
3,261,612
PISTON RING ASSEMBLY
Original Filed Nov. 19, 1962
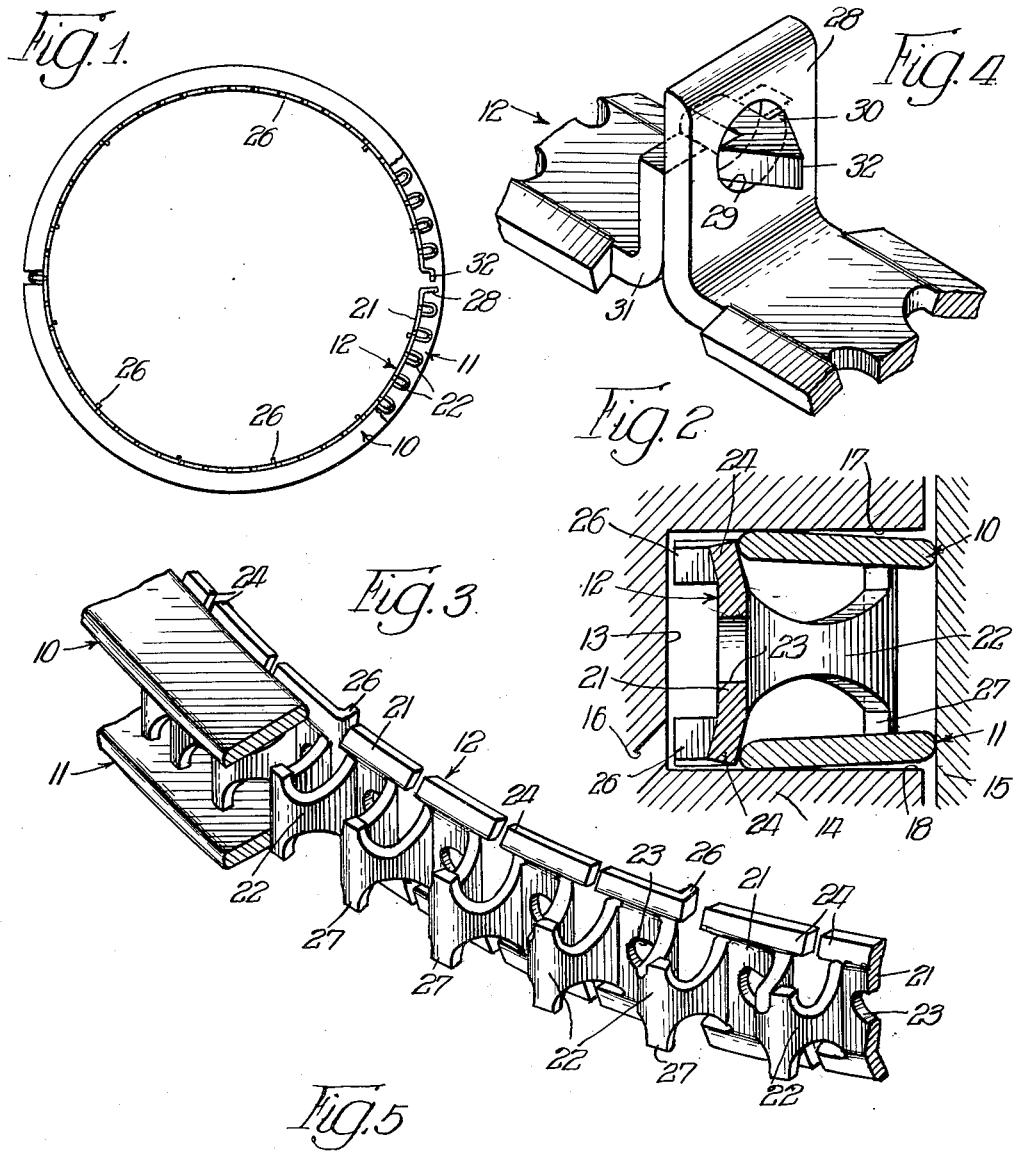
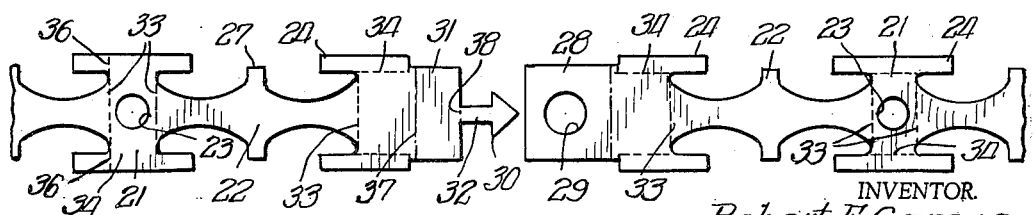
INVENTOR.
Robert F. Games,
BY
Hibben, Noyes & Bicknell
Attys.

United States Patent Office 3,261,612
Patented July 19, 1966

3,261,612
PISTON RING ASSEMBLY
Robert F. Games, Hagerstown, Ind., assignor, by mesne assignments, to Dana Corporation, Toledo, Ohio, a corporation of Virginia
Continuation of application Ser. No. 238,661, Nov. 19, 1962. This application Aug. 2, 1965, Ser. No. 479,040
12 Claims. (Cl. 277—140)

This invention relates to piston rings, and, more particularly, to an oil ring assembly for an internal combustion engine.

This application is a continuation of my copending application Serial No. 238,661, filed November 19, 1962, now abandoned.

It is a primary object of this invention to provide a piston ring assembly including rails and a circumferentially expansible combination spacer-expander, wherein the spacer-expander has improved deflection characteristics.

It is another object to provide a piston ring assembly of the foregoing character, having good oil drainage.

Still another object is to provide a piston ring assembly of the foregoing character, wherein the spacer-expander includes means for ensuring alignment of its ends when in abutment.

A still further object is to provide a piston ring assembly of the foregoing character, wherein the spacer-expander exerts its expanding force against the inner peripheries of the rails throughout the major part thereof and hence does not tend to gouge into the rails.

Other objects and advantages of the invention will become apparent from the following description taken in conjunction with the accompanying figures of the drawing, in which:

FIG. 1 is a plan view of a piston ring assembly embodying the invention;

FIG. 2 is an enlarged radial sectional view showing the assembly in a groove of a piston and confined within a cylinder;

FIG. 3 is an enlarged fragmentary perspective view of the assembly;

FIG. 4 is an enlarged fragmentary view of a part of the assembly; and

FIG. 5 is a fragmentary view of a strip of material from which part of the assembly is made.

In general a piston ring assembly for installation in a piston ring groove, embodying the invention comprises a pair of annular cylinder engaging rails, and a combination spacer-expander for forcing the rails outwardly. The spacer-expander comprises a plurality of circumferentially spaced axially extending support members, and a plurality of U-shaped spring members connecting the support members for circumferentially expanding the spacer-expander. The ends of the arms of the spring members are connected to the support members, and the spring members extend radially outward from the support members. To support the rails adjacent their outer peripheries and to hold them axially spaced, an axially extended portion is formed on each spring member at its outermost portion. The cross section of each arm is varied throughout its length by having the axial width of each arm decrease from the associated support member and from the axially extended portion toward a point substantially midway therebetween.

To engage the inner peripheries of the rails and to force them outwardly, tabs are formed on the upper and lower sides of each support member, and the tabs preferably slant inwardly from each supporting member to force the inner peripheries of the rails against the sides of the groove. The tabs are of sufficient length to extend circumferentially in both directions beyond the support members in order to engage the rails throughout the major part of their inner peripheries. If desired, the circumferentially extending portions of some of the tabs may be turned radially inward from the supporting members to prevent the spacer-expander from coming out of the piston ring groove when the piston is being inserted in the cylinder.

The spacer-expander is positioned between the rails with the circumferential tabs engaging the inner peripheries of the rails and forcing them radially outwardly, due to the action of the spring members. The inward slant of the tabs also forces the inner peripheral portions of the rails against the sides of the groove. The axially extending portions of the spring members are adapted to maintain the outer peripheries of the rails in axially spaced relation.

In greater detail, the piston ring assembly comprises a pair of annular rails 10 and 11, and a combined spacer-expander 12 (FIGS. 1, 2 and 3). The assembly is adapted to be positioned within an annular grove 13 formed within a piston 14, and confined within a cylinder 15 of an internal combustion engine. A passage 16 is also formed in the piston 14 leading from the bottom of the groove 13 adjacent its lower side to the interior of the piston for the purpose of draining oil from the groove 13.

Each rail 10 and 11 is preferably made from a flat strip of metal such as spring steel, and it is provided with a gap to permit it to expand radially. Each rail is preferably resilient and, by itself, exerts some outward pressure against the wall of the cylinder 15.

The spacer-expander 12 is made from resilient sheet metal and it is circumferentially expansible when it is confined within a cylinder with its ends in abutment. Its tendency to increase its circumferential dimension causes it to exert a radially outward pressure against the inner peripheries of the rails 10 and 11 and force the rails against the cylinder wall. The spacer-expander also holds the rails adjacent the upper and lower sides 17 and 18 of the groove 13 with the inner peripheral portions of the rails bearing respectively against the upper and lower sides in sealing relation therewith.

The spacer-expander 12 comprises a plurality of circumferentially spaced support members 21 connected by U-shaped spring members 22. The ends of the arms of each spring member 22 are integrally connected to adjacent support members 21, and the spring members 22 extend radially outward from the support members 21. An opening 23 is formed at substantially the center of each support member 21 for oil drainage purposes. Further, tabs 24 are formed on the upper and lower sides of the support members, the tabs 24 having sufficient circumferential length to extend circumferentially in both directions beyond the support members. As shown in FIGS. 2 and 3, the tabs slant axially outward and radially inward from the support members. If desired, certain tabs 24 may have end portions 26 turned radially inward. Thus, a tab on the upper and lower sides of every fifth support member 21 may have an end portion 26 turned inwardly, for example, or an inturned end portion 26 may be provided alternately on the upper and lower sides of spaced support members. These portions 26 may be provided when the depth of the groove 13 is relatively large or when the radial width of the rails 10 and 11 is relatively small, in order to prevent the assembly from coming out of the groove at one side of the piston should the assembly be moved toward that side during insertion of the piston into the cylinder.

Each U-shaped spring member 22 is formed with an enlarged axially extended portion 27 at its outermost portion to hold the rails in axially spaced relation adjacent their outer peripheries. Further, the cross section of each arm of each spring member 22 is varied throughout its length, the cross section decreasing from the ends of the arms and from the enlarged portion 27 by a decrease in the axial width of each arm. As shown in FIGS. 3 to 5, each arm of each spring member is substantially symmetrical throughout its length about a plane perpendicular to the axis of the spacer-expander and midway between the two sides of the spacer-expander. Each arm is also substantially symmetrical about a line extending axially through the midpoint of the arm. The cross section of each arm is designed to produce a substantially uniform stress condition throughout its length when under load, due to the fact that the moment of inertia changes with the moment arm. In other words, the cross sectional area of each arm varies and, at each section, the area substantially corresponds to the moment imposed on that section.

Each arm of each spring member may be considered two cantilever beams, one of the beams extending from the associated support member 21 to the midpoint of the arm and the other beam extending from the axially extended portion 27 to the midpoint of the arm. The support member 21 and the axially extended portion 27 may be considered fixed points for the two beams of each arm, and the midpoint of the arm may be considered the load point. To obtain a theoretically uniform stress condition in each beam, the axial width of each beam should decrease linearly from a maximum width at the fixed point to zero width at the load point. Thus, each arm would resemble two triangles having their apexes in abutment at the midpoint of the arm and their bases connected to the support member 21 and the axially extended portion 27. Such a configuration is impractical of course because material must be provided at the midpoint of each arm to hold the two portions of the arm together. Thus, as shown in FIG. 5, the midpoint of each arm is widened axially to give it sufficient strength to hold the portions together under load. From its midpoint, each arm increases in axial width in both directions, and the sides of the arms approximate straight lines corresponding to the sides of the above mentioned triangles.

Advantages of the described design of the arms of the spring members 22 are that deflection of the spacer-expander is more satisfactory at the same load than is obtainable by prior art spacer-expanders, and that the instant spacer-expander provides a large amount of open space around the arms and through the spaces between the support members 21 for oil drainage. The small contact area between each portion 27 and the rails 10 and 11, and the improved oil drainage reduce the possibility of carbon build-up and consequent unitizing of the assembly. Furthermore, the relatively large cut-away areas at the sides of the arms make it possible from a manufacturing standpoint to provide the circumferentially extending tabs 24. The foregoing advantages result from an application of the uniform stressed beam theory to the design of the spring members 22.

The ends of the spacer-expander are provided with radial plates 28 and 31 (FIGS. 1 and 5) adapted to abut each other, these plates having approximately the same width as the support members 21. Means is also provided for ensuring proper alignment of the ends and for connecting the ends together, which may comprise an opening 29 formed in the plate 28 and a circumferentially extending portion 32 formed on the plate 31 and adapted to engage in the opening 29. The portion 32 is preferably arrow shaped and includes barbs 30 which have a width slightly less than the diameter of the opening 29. When the ends of the spacer-expander are brought together until the plates 28 and 31 abut, the pointed end of the portion 32 enters the opening 29 and guides the ends into proper alignment. If the force applied to the spacer-expander to bring its ends together is released, the barbs 30 catch on the plate 28 around the margin of the opening 29 and prevent the ends from becoming disengaged. When the spacer-expander is confined within a cylinder, the plates 28 and 31 abut each other, and the portion 32 prevents overlapping of the ends.

The spacer-expander 12 is preferably formed from a flat strip of sheet metal which is punched to the form shown in FIG. 5. In punching from a practical standpoint, it would not be practical to make the sides of the arms, adjacent the support members 21, straight lines because of the tabs 24. The inner end of the recess between an arm which is connected to a support member 21 and an adjacent tab 24 is preferably large enough to permit the use of a punch having substantial body without any thin portions. To this end, the side of the arm at the line where it is connected to the support member 21 is spaced from the tab 24 and fillets are provided in the corners to eliminate sharp corners on the punch to lessen the change of breakage at these corners. Since the arms are also widened adjacent their midpoints, the side edges of the arms are in the form of a smooth curve to facilitate manufacture of the expander. Such smooth curve conforms substantially to the theoretical configuration of a uniformly stressed beam.

After the strip of metal is punched, it is bent along the dashed lines 33 to form the spring members 22, and along the dashed lines 34 to from the tabs 24. The strip may also be bent along the lines 36 to form the radial end portions 26 of the tabs 24. Further, the strip is bent along the lines 37 to form the plates 28 and 31, and the longitudinal arrow shaped portion 32 is formed by bending along the line 38.

When the assembly is installed in the piston ring groove 13 and confined within the cylinder 15 as shown in FIG. 3, the slant of the tabs 24 of the support members 21 force the rails 10 and 11 outwardly and the inner peripheries of the rails against the upper and lower sides 17 and 18 of the groove 13 to produce side sealing. The outer peripheries of the rails 10 and 11 are held in axially spaced relation by the enlarged axial portions 27 of the spring members 22. Some dishing of the rails 10 and 11 may occur when the assembly is in operation, as shown in FIG. 2.

During the operation of the engine containing the piston 14 and the cylinder 15, oil scraped off the walls of the cylinder 15, flows freely around the arms of the spring members 22 and through the spaces between the support members 21, and through the openings 23 of the support members 21, to the space behind the support members 21, and from this space into the passage 16.

Beside the previously described advantages of improved deflection and oil drainage characteristics due to the shape of the arms of the spring members 22, the assembly has a further advantage in that the tabs 24 engage the rails 10 and 11 around almost their entire inner peripheries. This large bearing area is provided by having the tabs extend circumferentially beyond the support members 21. In constructions where the bearing surface between the rails and the spacer-expander is relatively small, there is a tendency for the spacer-expander to index itself or gouge into the inner peripheries of the rails, which tendency is avoided by the present construction.

I claim:

1. In a piston ring assembly adapted to be installed in an annular groove formed in a piston of an internal combustion engine and including a pair of annular rails, an annular spacer-expander for forcing the rails outwardly, said spacer-expander comprising a plurality of circumferentially spaced axially extending support members, and a plurality of U-shaped spring members connecting said support members for circumferentially expanding said spacer-expander, each of said spring members including a pair of arms connected at their outer ends by an intermediate portion which extends axially to support said rails adjacent their outer peripheries, the inner ends of said arms being connected to adjacent support members, and said spring members extending radially outward from said support members, each arm of each of the said spring members including an inner portion which decreases in cross section from said support members to substantially the midpoint of said arm, and an outer portion which increases in cross section from substantially said midpoint to said intermediate portions, both of said arm portions having a substantially uniform stress condition throughout the length thereof under load, and the area at each section of each of said arm portions corresponding substantially to the moment imposed on that section, said inner and said outer portions of each arm when taken together approximating a pair of triangles with their apexes joined in said midpoint region, the midpoint region of each of said arms having a shape and size just sufficient to maintain the structural integrity of said arm, whereby each arm is designed and shaped both to produce a substantially uniform stress condition throughout its length when under load, and to provide large cut-away areas at the sides thereof for good oil drainage therearound, said spacer-expander being adapted to be positioned between said pair of rails, and said support members having means for engaging the inner peripheries of said rails and for urging said rails outwardly.

2. The article of claim 1, wherein said arms are substantially symmetrical throughout their lengths about a plane perpendicular to the axis of the spacer-expander and midway between the two sides of the spacer-expander.

3. The article of claim 2, wherein each arm is also substantially symmetrical about a line extending axially through the mid-point of said arm.

4. In a piston ring assembly adapted to be installed in an annular groove formed in a piston of an internal combustion engine and including a pair of annular rails, the article comprising an annular spacer-expander for forcing the rails outwardly, said spacer-expander comprising a plurality of circumferentially spaced axially extending support members, and a plurality of U-shaped spring members connecting said support members for circumferentially expanding said spacer-expander, each of said spring members having the intermediate portion of the U-shape extending axially to support said rails adjacent their outer peripheries and having the ends of its arms connected to adjacent support members, and said spring members extending radially outward from said support members, each arm of each of said spring members decreasing in cross section from said support members to substantially its midpoint and then increasing in cross scetion to said intermediate portion and having a substantially uniform stress condition throughout the length thereof under load, and the area at each section of each of said arms substantially corresponding to the moment imposed on that section, each of said arms approximating a pair of triangles with their apexes joined at said midpoint, the midpoint region of each of said arms having a shape and size just sufficient to maintain the structural integrity of the arm, whereby each arm is designed and shaped both to produce a substantially uniform stress condition throughout its length when under load, and to provide large cut-away areas at the sides thereof for good oil drainage therearound, said spacer-expander being adapted to be positioned between said pair of rails, and said support members having means for engaging the inner peripheries of said rails and for urging said rails outwardly.

5. The article of claim 4, wherein said means comprises tabs at the upper and lower sides of said support members, said tabs being adapted to engage the inner peripheries of said rails and force the rails outwardly and having end portions extending circumferentially in both directions beyond said support members, said end portions being axially spaced from the adjacent portions of said arms.

6. The article of claim 5, wherein certain of said tabs have end portions extending radially inward from said support members, and other of said tabs extend solely circumferentially.

7. In a piston ring assembly adapted to be installed in an annular groove formed in a piston of an internal combustion engine and including a pair of rails, the article comprising an annular spacer-expander for forcing the rails outwardly, said spacer-expander comprising a plurality of circumferentially spaced axially extending support members, and a plurality of U-shaped spring members connecting said support members for circumferentially expanding said spacer-expander, each of said spring members having the ends of its arms connected to adjacent support members, and said spring members extending radially outward from said support member, each arm of each of said spring members decreasing in cross section from said support member and having a substantially uniform stress condition throughout the length thereof under load, and the area at each section of each of said arms substantially corresponding to the moment imposed on that section, said spacer-expander being adapted to be positioned between said pair of rails, and said support members having means for engaging the inner peripheries of said rails and for urging said rails outwardly, both ends of said spacer-expander including plates extending radially outward, said plates having aligning and interlocking means formed thereon, said aligning and interlocking means comprising a hole formed in one of said plates, and a portion formed on the other of said plates adapted to extend into said hole, said last named portion being pointed at its end for guiding said portion into said hole, and said last named portion further including barbs adjacent its pointed end for retaining said portion within said hole.

8. In a piston ring assembly adapted to be installed in an annular groove formed in a piston of an internal combustion engine and including a pair of rails, the article comprising an annular spacer-expander for forcing the rails outwardly, said spacer-expander comprising a plurality of circumferentially spaced axially extending support members, and a plurality of U-shaped spring members connecting said support members for circumferentially expanding said spacer-expander, each of said spring members having the ends of its arms connected to adjacent support members, and said spring members extending radially outward from said support member, each arm of each of said spring members decreasing in cross section from said support member and having a substantially uniform stress condition throughout the length thereof under load, and the area at each section of each of said arms substantially corresponding to the moment imposed on that section, said spacer-expander being adapted to be positioned between said pair of rails, and said support members having means for engaging the inner peripheries of said rails and for urging said rails outwardly, both ends of said spacer-expander including plates extending radially outward, said plates having aligning and interlocking means formed thereon, said aligning and interlocking means comprising a hole formed in one of said plates, and a portion formed on the other of said plates adapted to extend into said hole, said last named portion being pointed at its end for guiding said portion into said hole, and said last named portion further including at least one barb adjacent its pointed end for retaining said portion within said hole.

9. In a piston ring assembly adapted to be installed in an annular groove formed in a piston of an internal combustion engine and including a pair of annular rails, an annular spacer-expander for forcing the rails outwardly and for holding the rails in axially spaced relation, said spacer-expander including a plurality of circumferentially spaced spring members tending to circumferentially expand said spacer-expander, said spacer-expander being adapted to engage said pair of annular rails at their inner peripheries and urge said rails radially outward and to engage the adjacent sides of said rails and hold the rails in axially spaced relation, said spacer-expander being split and having abutting ends, both ends of said spacer-expander including radially extending plates, said plates having aligning and interlocking means formed thereon, said aligning and interlocking means comprising a hole formed in one of said plates, and a portion formed on the other of said plates adapted to extend into said hole.

10. In a piston ring assembly according to claim 9, wherein said last named portion is substantially pointed at its end for guiding said portion into said hole, and said last named portion includes at least one barb adjacent its end for retaining said last named portion within said hole.

11. In a piston ring assembly according to claim 10, wherein said last named portion includes two barbs adjacent its end for retaining said last named portion in said hole.

12. In a piston ring assembly adapted to be installed in an annular groove formed in a piston of an internal combustion engine and including a pair of annular rails, the article comprising an annular spacer-expander for forcing the rails outwardly, said spacer-expander comprising a plurality of circumferentially spaced axially extending support members, and a plurality of spring members connecting said support members for circumferentially expanding said spacer-expander, said spring members being adapted to engage the adjacent sides of said rails and hold the rails in axially spaced relation, said spacer-expander being adapted to be positioned between said pair of rails, and said support members having means for engaging the inner peripheries of said rails and for urging said rails outwardly, said spacer-expander being split and having abutting ends, both ends of said spacer-expander including a plate extending radially, said plates having aligning and interlocking means formed thereon, said aligning and interlocking means comprising a hole formed in one of said plates, and a portion formed on the other of said plates adapted to extend into said hole.

References Cited by the Examiner
UNITED STATES PATENTS

| 2,635,022 | 4/1953 | Shirk | 277—140 |
| 3,004,811 | 10/1961 | Mayfield | 267—1.5 X |
| 3,140,096 | 7/1964 | Rodenkirchen | 277—141 |

FOREIGN PATENTS 1,123,357  6/1956  France.

LAVERNE D. GEIGER, *Primary Examiner.*

J. MEDNICK, *Assistant Examiner.*